April 19, 1960
E. E. WAGNER
2,932,949
VARIABLE SPEED CONSTANT POWER FLUID TRANSMISSION
Original Filed Aug. 24, 1955
7 Sheets-Sheet 4
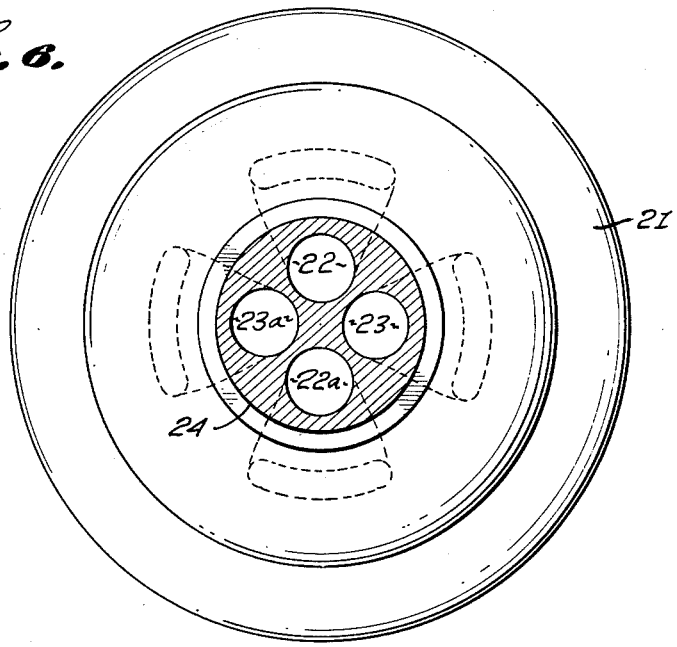
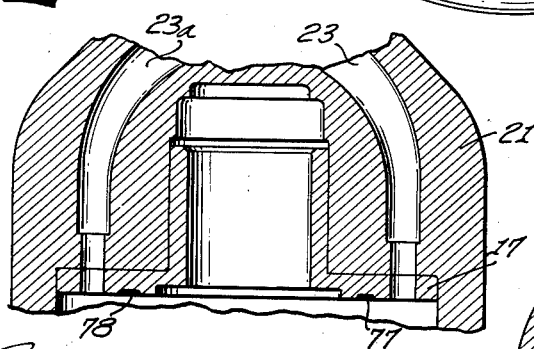
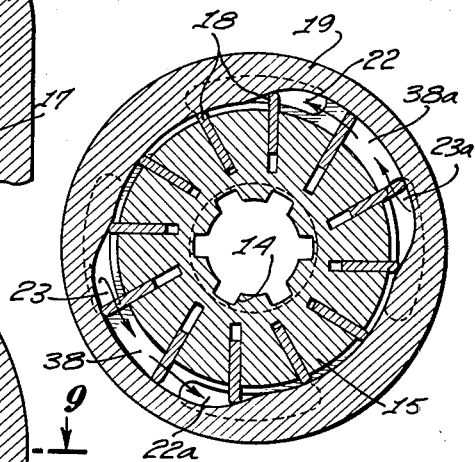
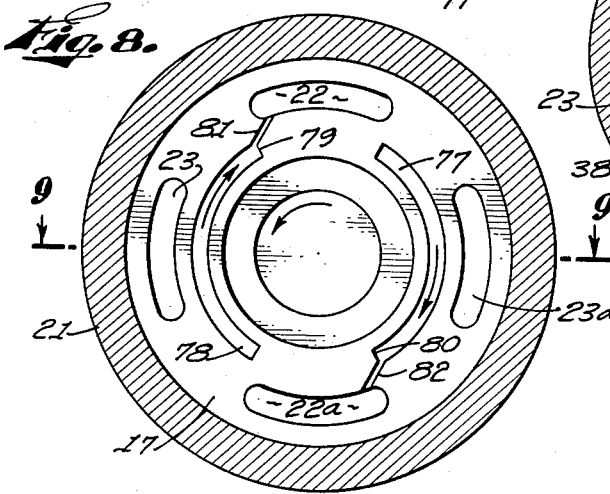

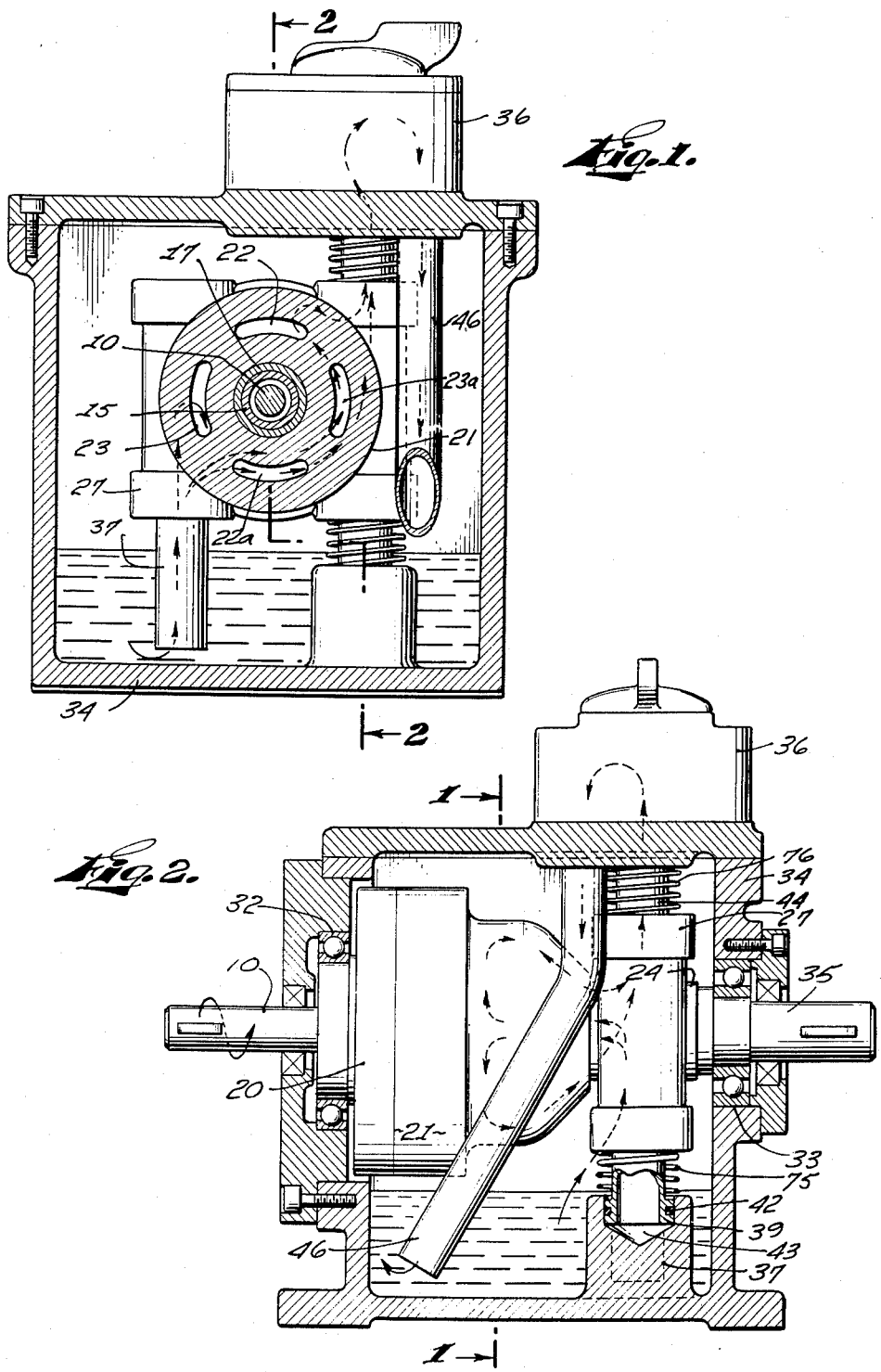
April 19, 1960     E. E. WAGNER     2,932,949
VARIABLE SPEED CONSTANT POWER FLUID TRANSMISSION
Original Filed Aug. 24, 1955     7 Sheets-Sheet 1

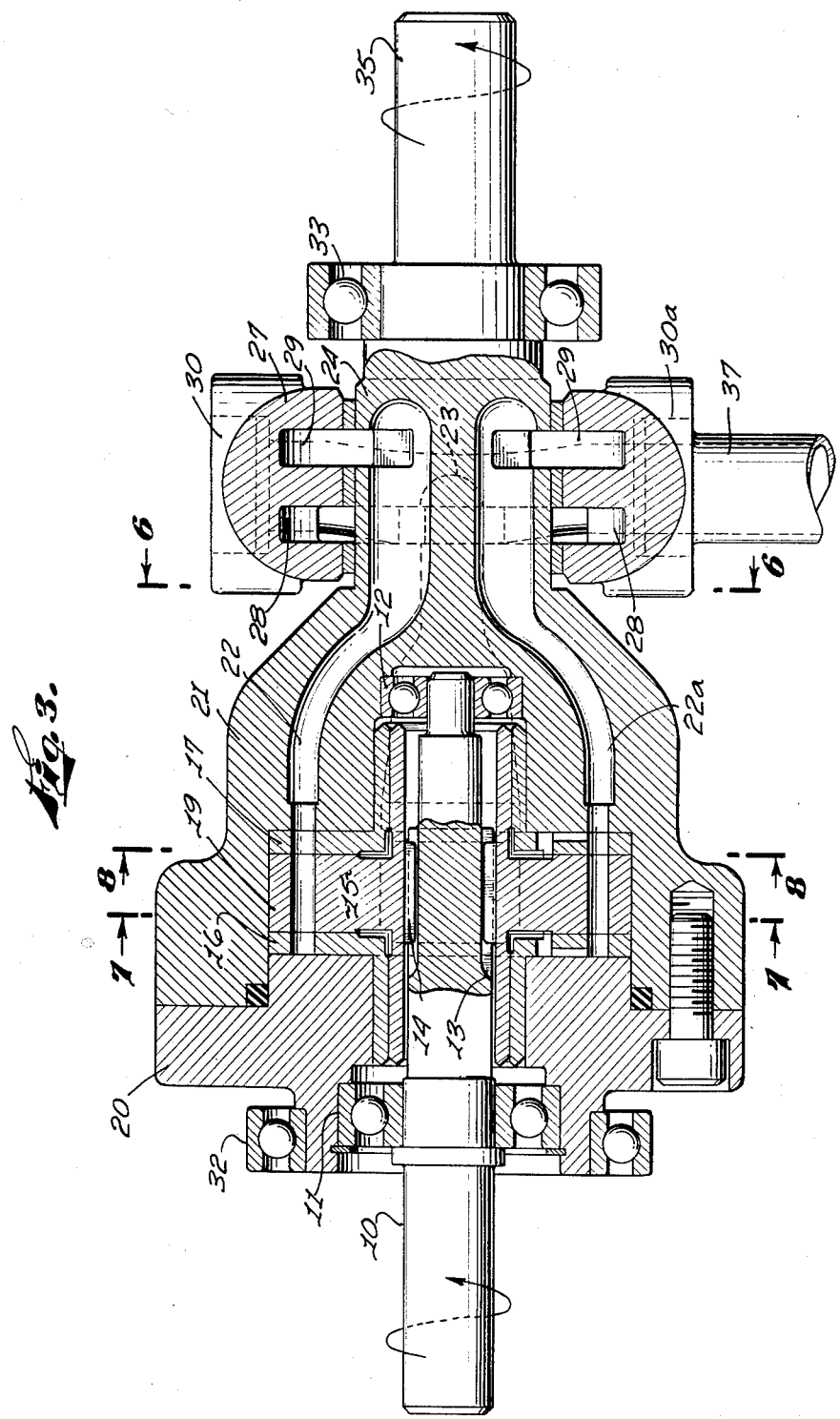

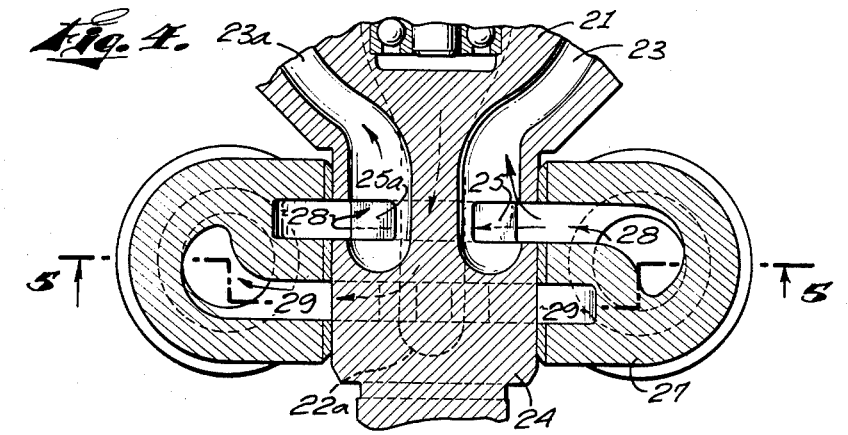
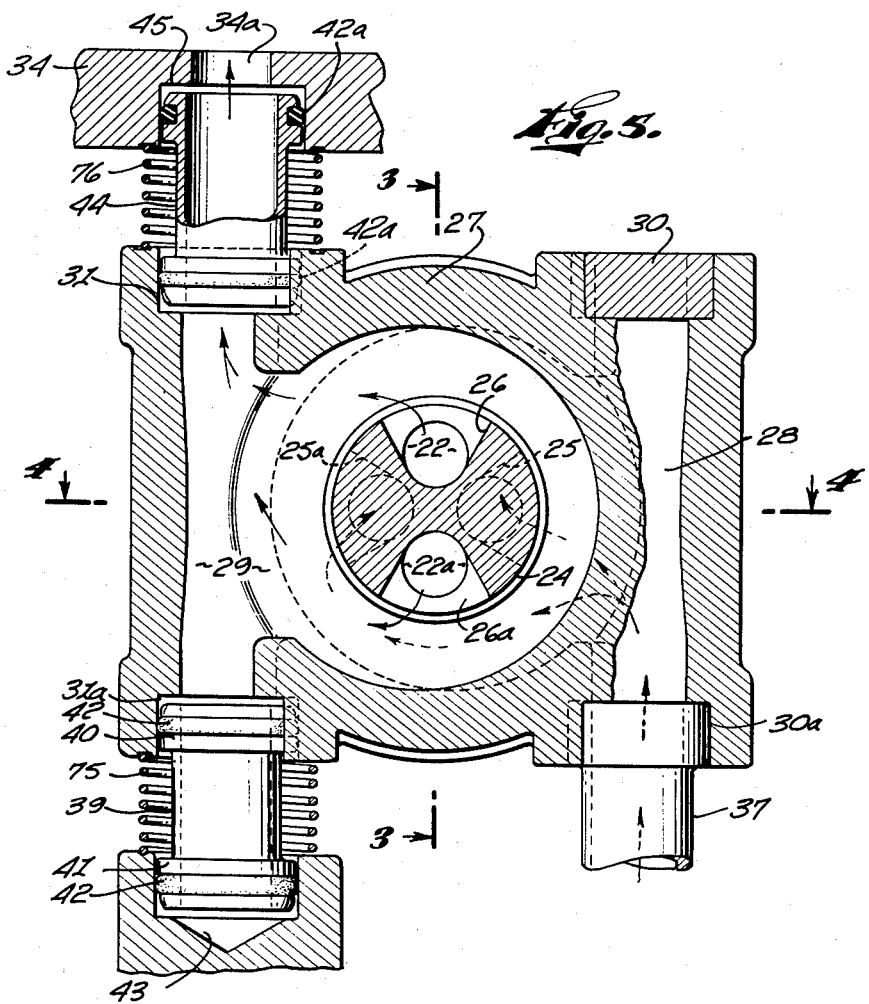

April 19, 1960

E. E. WAGNER 2,932,949

VARIABLE SPEED CONSTANT POWER FLUID TRANSMISSION

Original Filed Aug. 24, 1955

United States Patent Office 2,932,949
Patented Apr. 19, 1960

2,932,949

VARIABLE SPEED CONSTANT POWER FLUID TRANSMISSION

Ernest E. Wagner, Santa Ana, Calif.

Original application August 24, 1955, Serial No. 530,307. Divided and this application April 25, 1956, Serial No. 580,665

8 Claims. (Cl. 60—53)

This is a division from my application Serial No. 530,307 filed August 24, 1955.

This invention relates to improvements in fluid transmissions in which a constant speed input shaft, a variable speed output shaft and means for converting the input torque—by energy feed back—are so combined that the primary requirement of a constant power drive, namely—input speed times input torque equals output speed times output torque—is fulfilled.

An essential object of the invention is to provide a device in which all of the individual elements are inherently balanced and rotate upon axes, which at all times coincide with a common axis of rotation, in order to prevent imbalance at high rotative speeds and wear induced by large centrifugal forces.

A further and important object of the invention is to provide a variable speed transmission in which the flow of fluid through the various units comprising the device is proportional to the difference in speed between the input and output shafts and thereby circulate fluid through the units at a rate of flow progressively increasing until the minimum or maximum speed is reached, which circulation is intended to keep the units cool and prevent the formation of hot spots and attendant troubles.

Another object of the invention is to provide, in a transmission of this type, a means for conducting fluid flow to one or more devices and returning it in a continuous circuit, one of the devices being adapted to regulate the speed and feed energy back into the unit, which would otherwise be wasted.

A further object of the invention is to provide a device of the character referred to which is of great simplicity, ease of manufacture, assembly and replacement of worn parts.

Other objects and advantages will become apparent from the following description in connection with the accompanying drawings in which Fig. 1 is a cross section of a variable speed unit and its housing on line 1—1 of Fig. 2.

Fig. 2 is a cross section on line 2—2 of Fig. 1 through the outer housing only, in order to show the variable speed unit and accessories in their entirety in position relative to the housing.

Fig. 3 is a longitudinal section through the variable speed unit on line 3—3 of Fig. 5.

Fig. 4 is a horizontal cross section of the rotary valve on line 4—4 of Fig. 5.

Fig. 5 is a vertical cross section of the rotary valve on line 5—5 of Fig. 4.

Fig. 6 is a cross section through the variable speed unit on line 6—6 of Fig. 3.

Fig. 7 is a cross section through the unit on line 7—7 of Fig. 3, housing and drive shaft omitted.

Fig. 8 is a cross section through the unit on line 8—8 of Fig. 3 after removing rotor and drive shaft.

Fig. 9 is a fragmentary cross section on line 9—9 of Fig. 8.

Figs. 10a and 10b are partial longitudinal sections of a constant power unit wherein Fig. 10a represents the left hand and Fig. 10b the right hand portion of the unit.

Figure 10A:
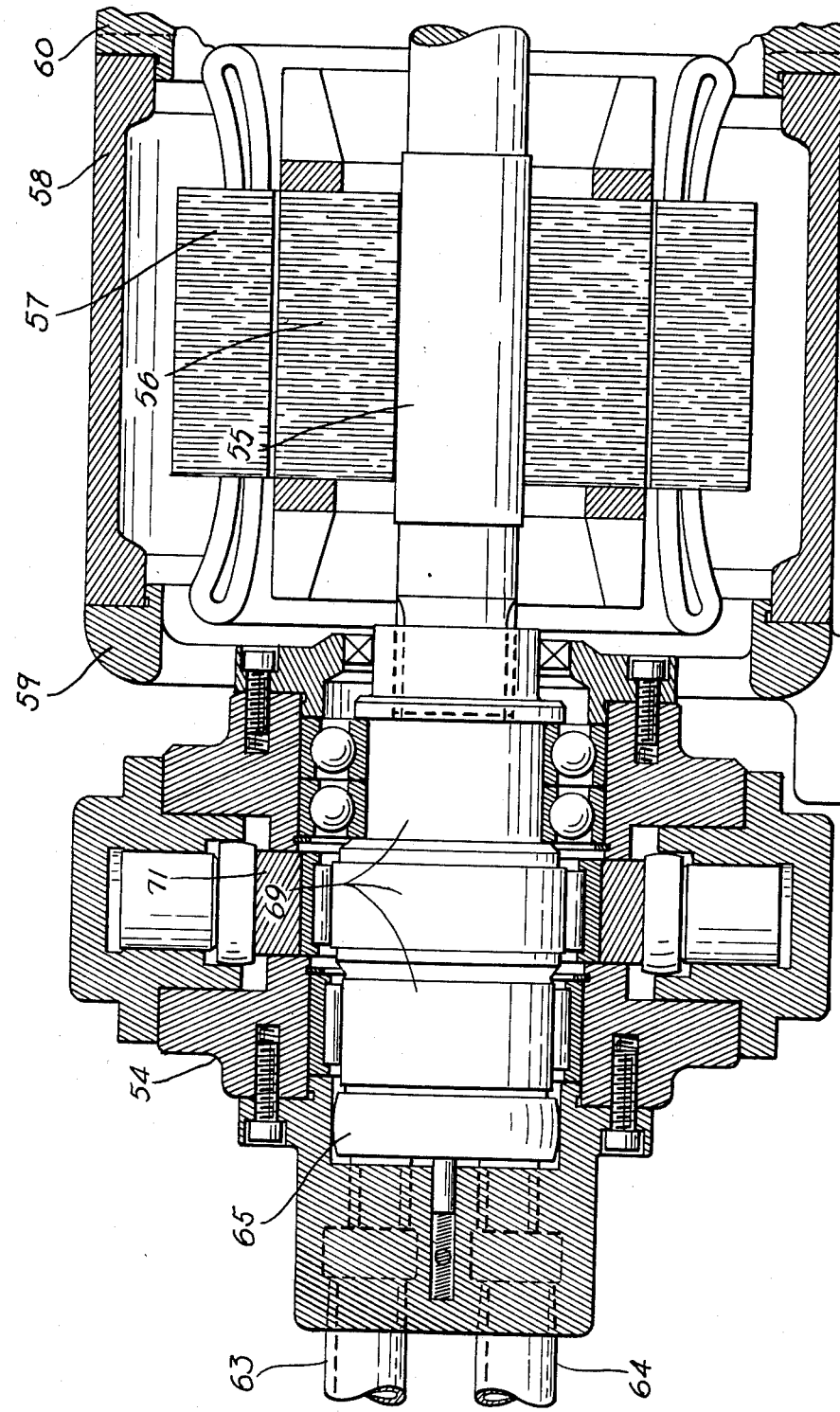
Figure 10:
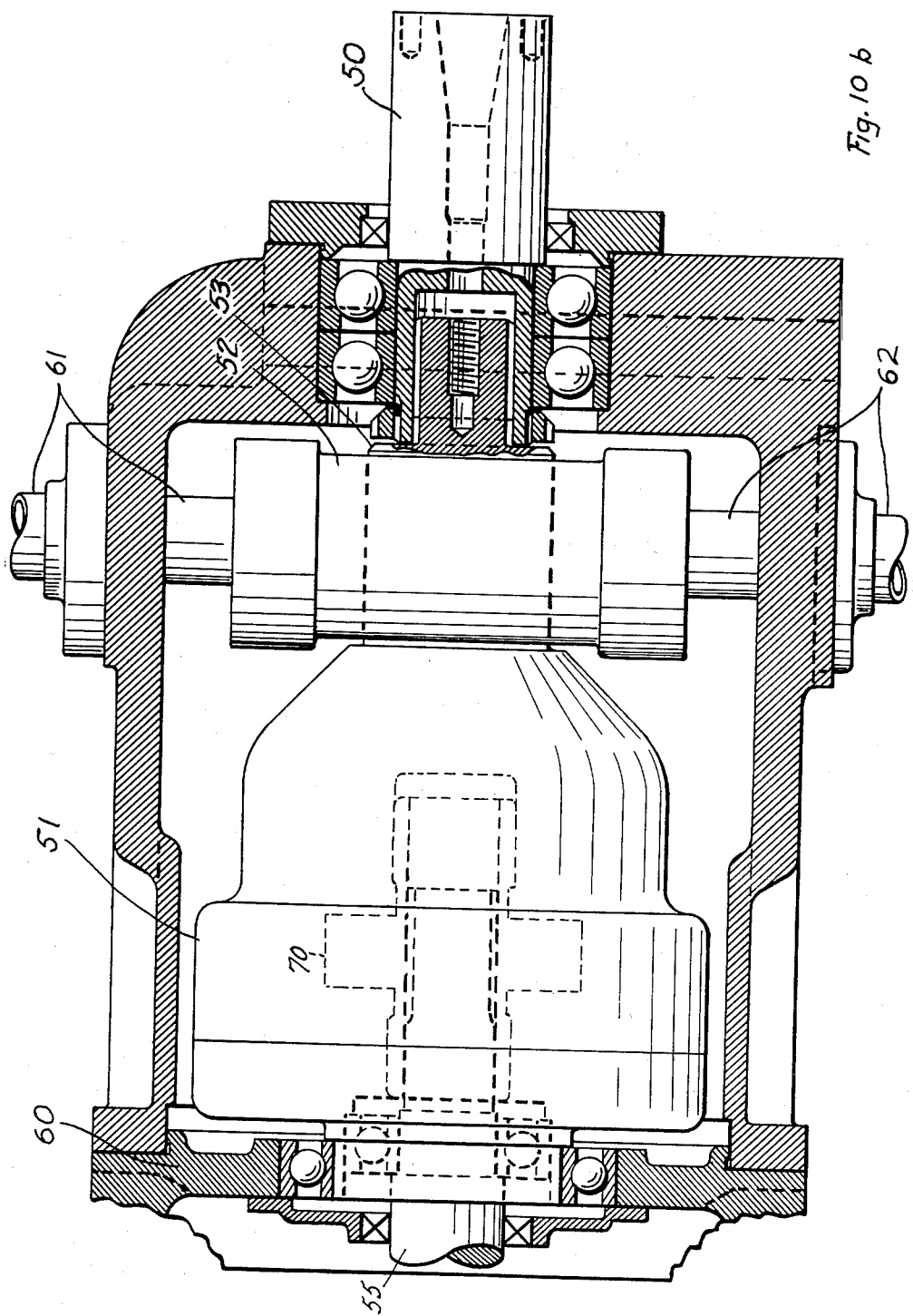

A variable speed device of the type shown, Figs. 1–9, consisting of an input end 10, an output end 35—the two mounted coaxially so that each is free to rotate independently of the other—and fluid inlet-outlet means 24 and 27, has a fixed displacement per revolution and can displace varying amounts of fluids only by a difference in speed between input and output shafts. At times it may and does perform the function of a hydraulic clutch, but it cannot be so employed when applied to a transmission in the manner set forth in this invention. In the description following, it will therefore be understood that reference to a "fixed displacement unit" shall signify a type of unit as exemplified by Fig. 3, without regard to the phase in which it may be momentarily operating, whether functioning as a pump, as a motor or as a coupling.

For output shaft speeds equal to input shaft speeds there can be no fluid flow and the fixed displacement unit must act as a coupling.

For output shaft speeds less than input shaft speeds the fixed displacement unit acts as a pump, delivering a volume of fluid proportional to the difference in speed and at a pressure proportional to the load.

For output shaft speeds greater than input shaft speeds, a volume of fluid, again proportional to the difference in speed and at a pressure proportional to the load on the output shaft must be delivered to the fixed displacement unit which, thereby, acts as a hydraulic motor.

It should be noted that the volume of fluid under pressure involved at any time is proportional to the difference in the speed of the two shafts.

The use of devices which throttle the flow of fluid under pressure, such as a flow control valve 36 in Figs. 1 and 2, convert the energy in the fluid to heat which cannot be recovered, nor is torque conversion possible by their use.

Whenever it is objectionable to turn substantial amounts of energy into heat either due to the cost of energy or the expense and inconvenience of dissipating the heat, or wherever a variable speed drive must generate a greater output torque than input torque, then the energy in the fluid under pressure being metered off must be recaptured or regained and fed back to the input. No other approach to the problem will result in a drive with constant power output characteristics, wherein the torque output is inversely proportional to the output speed.

Replacement of the flow control valve 36 in Figs. 1 and 2 by a device capable of feeding the energy back to the input shaft is therefore compulsory and any device acceptable must be able to fulfill the conditions outlined in the foregoing.

A further and important requirement that the device must fulfill is that it must run at a speed in step with the input shaft, i.e., some fixed ratio between the two must prevail, generally 1:1 but not necessarily so.

A positive displacement, reversible, variable delivery unit is such a device, in fact, it can be shown that with a displacement equal to that of the fixed displacement unit and a speed ratio of 1:1, the unit is capable of varying the speed of the output shaft from zero to twice the input speed, the speed depending solely upon the setting of the stroke control 71, Figs. 10a, 11a, 12a, and 13a, while simultaneously generating torque values inversely proportional to the speed so that torque times speed equals a constant. Conversely all the energy contained in the fluid coming from the fixed displacement unit is recaptured or regained and fed back to the input shaft by means of the "variable delivery unit" which in the description following will be so referred to, irrespective of the fact that at times it acts as a shut off valve, at other times as a motor and again in still other phases of operation as a pump.

For a better understanding of the details of the fixed displacement unit, before it is incorporated into an integrated structure, reference is made to Fig. 3 wherein an input shaft 10 is carried in antifriction bearings 11—12 supported in a two-piece housing 20—21, said shaft provided with splines 13, for driving mating splines 14, Fig. 7, in a rotor 15. The rotor in combination with end plates 16—17, vanes 18 and cylinder 19 comprises a conventional balanced cartridge type pump, which assembly is mounted as a unit in a housing consisting of coverplate 20 and body 21 having suitable fluid conducting passageways 22—22a, 23—23a, and terminating in an integral pintle 24 provided with intake ports 25—25a, and outlet ports 26—26a, Figs. 4–5.

A stationary valve body 27 is mounted upon and surrounds the rotatable pintle 24 and cooperates therewith to form a rotary valve. For this purpose the valve body 27 is provided with an intake port 28 and outlet port 29, these ports adapted to register or mate respectively with the ports 25—25a, and 26—26a of the pintle. The valve body or housing is provided with inlets 30—30a and outlets 31—31a, Fig. 5.

The complete unit is free to rotate upon concentrically mounted bearings 32—33 supported by suitable means such as a housing 34 and the integral extension of the pintle serves as the output shaft 35.

Upon driving the input shaft 10 in the direction of the arrow at a speed sufficiently high to throw vanes 18, under the action of centrifugal force, against the inner surface of the cylinder 19, fluid is drawn in from the reservoir in the housing 34 via suction pipe 37, inlet 30a—inlet 30 has been plugged—inlet port 28 in the valve body and inlet ports 25—25a in the pintle, fluid passageways 23—23a and end plate 17 into the vane pockets 38—38a, thence transported by rotor 15 to passageways 22—22a Fig. 7 which terminate in the pintle 24, and there expelled through ports 25—25a in the pintle to port 29 in the valve body 27 to outlets 31 and 31a.

Outlet 31a contains a flexibly mounted tubular fitting 39 possessing spherically shaped ends 40—41 which may have O rings 42 in suitably shaped grooves, the fitting 39 terminating in a blind hole 43.

Outlet 31 contains a flexibly mounted tubular fitting 44 which is identical in design to fitting 39 and which terminates in a recess 45 in the housing 34.

As the outlet 31a is blocked, fluid is forced to flow through the outlet 31, fitting 44, a suitable hole 34a in housing 34, flow control valve 36 and the return tube 46 back to the reservoir in the housing 34.

Upon regulating the flow control valve 36, a standard commercial item, from fully closed to fully open, the speed of the output shaft 35 will vary from full speed—equal to the input speed—to fully stopped, in increments proportional to the setting of the flow valve, while the input shaft 10 is rotating continuously at full speed. In this instance the unit functions as a hydraulic clutch.

The arrows indicate fluid flow in accordance with the foregoing description.

Fitting 39 permits hydraulic fluid to enter the blind hole 43 in the housing 34. The pressure reaction against the housing effectively offsets the reaction due to the pressure of the hydraulic fluid leaving the valve body 27 through the fitting 44, whereas the O rings 42—42a permit minute movement of the valve body relative to the housing in any direction by flexing slightly, that is, by elastic deformation only, not by sliding.

Helical springs 75—76 maintain the position of the valve body 27 relative to the housing 34 under the action of viscous shear forces in the capillary seal between the valve body 27 and the pintle 24, due to the latter's rotation. The helical springs do not interfere with minute movements of the valve body as they also are able to flex minutely in all directions with only negligible resistance.

Should a reversing drive be required then the openings 30—30a must also be provided with duplicates of fittings 39 and helical springs 75.

My invention comprises a power driven, variable speed, constant power, mechanically coupled hydraulic drive, see Figs. 10a–10b, in which an output shaft 50, shown in the form of a machine tool spindle, is directly coupled to a fixed displacement unit 51, which is substantially as described in connection with Figs. 3–9, except as modified by the requirements of the hydraulic transmission shown in Figs. 10a–10b, the latter fully described in the text immediately following.

The input shaft 55 of the fixed displacement unit is extended to serve as a connection between the fixed displacement unit 51 and the variable delivery unit 54, as well as a shaft for the rotor 56 of the electric motor 57—58. Adaptor plates 59—60 respectively connect the variable delivery unit and the fixed displacement unit to the electric motor frame 58.

The fixed displacement unit 51 is in principle identical to Fig. 3. The variable delivery unit 54, serving to regulate the speed and torque and transfer energy between input and output shafts, may be any positive displacement, variable delivery, reversible pump which can be adapted to this service and as explained replaces the flow control valve 36 of Figs. 1 and 2.

Although Figs. 10a–10b show an electric motor located between the two hydraulic units, the input shaft 55 may readily be carried through the variable delivery unit and extended to one side of the transmission for connection to any suitable source of power.

Figures 11, 11A:
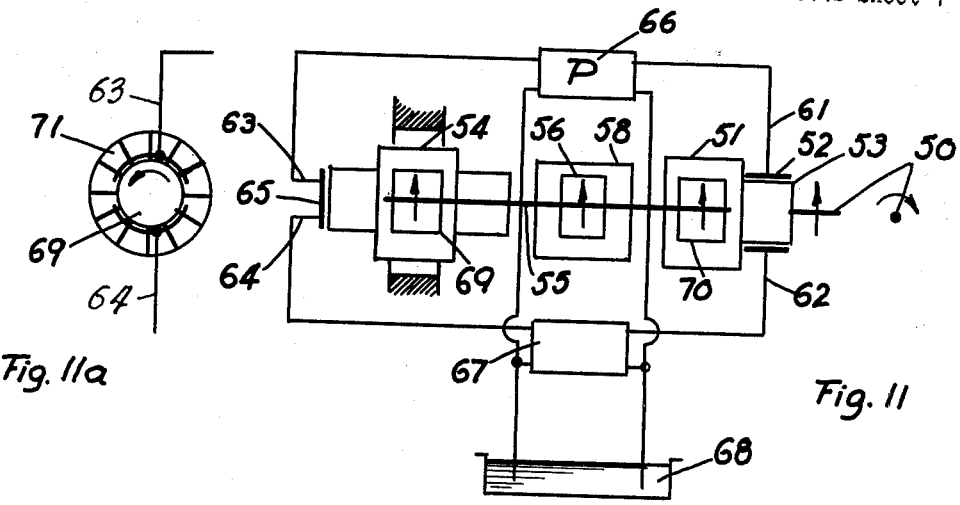
Figs. 11–11a, 12–12a and 13–13a are schematic representations of a constant power unit in various phases of operation.
Figures 12, 12A:
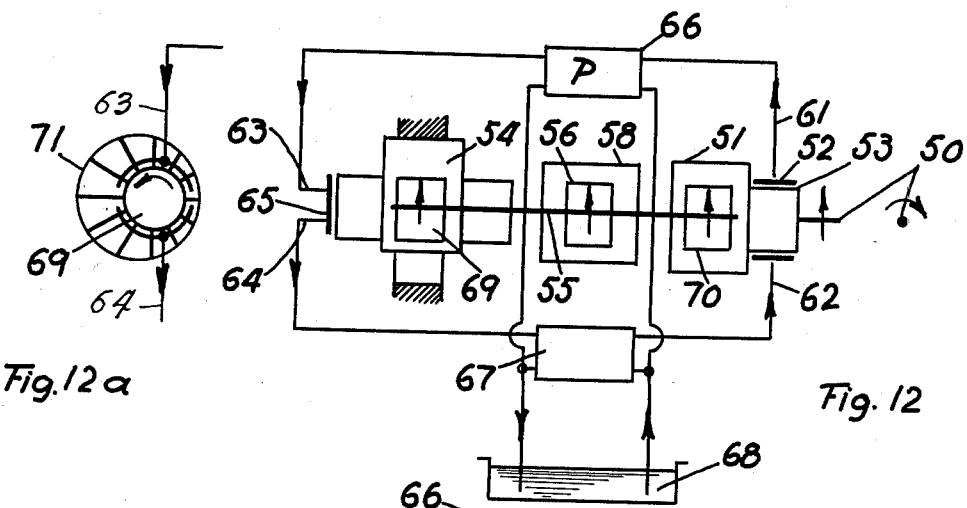
Figures 13, 13A:
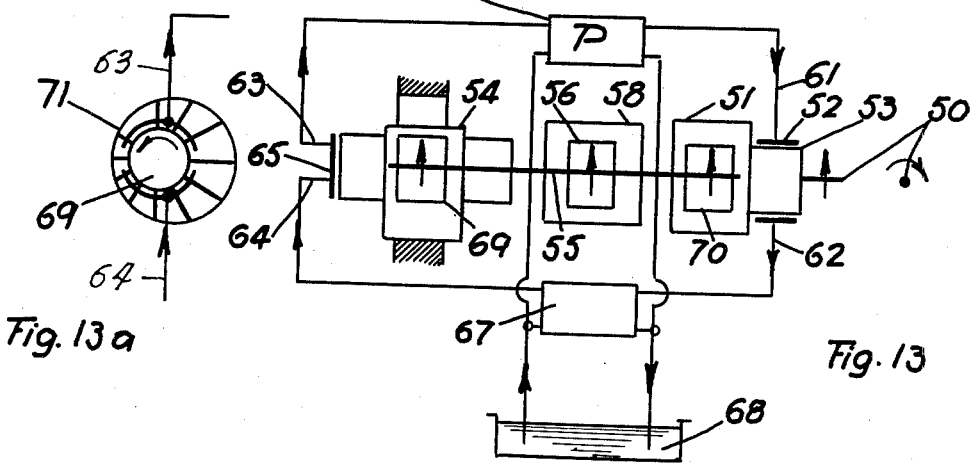

Fluid conducting connections 61—62 of the fixed displacement unit and fluid conducting connections 63—64 of the variable delivery unit are connected as shown in the schematic diagrams, Figs. 11–12–13. The plate valve of the variable delivery unit is indicated at 65. Arrows show the direction of rotation and direction of fluid flow. "P" indicates at which point in the system torque in the form of p.s.i. is being transferred. Figs. 11a–12a–13a show the positions of the stroke adjustor 71 relative to the rotor and with respect to the direction of rotation, which positions control the output speed and torque.

Special manifolds are indicated at 66 and 67. They may contain—depending upon the service—such devices as relief valves, shuttle valves, flushing valves, temperature limiting controls etc., but in no way alter the principle of operation. An oil reservoir is indicated at 68.

The rotor 69 of the variable delivery unit 54 is rigidly connected to the rotor 70 of the fixed displacement unit 51 by means of shaft 55 which is shown driven by the electric motor 58, but may be driven by any other means.

Speed variation and attendant torque conversion is accomplished in the following manner: In Fig. 11a the stroke adjustor 71 is shown in its neutral position, in which position it is concentric with the rotor 69 and no displacement of fluid can take place. Fluid flow from the fixed displacement unit is thereby blocked and the output shaft 50 is forced to turn at substantially the speed of the input shaft 55. Pressure, proportional to the load on the output shaft 50 is generated in the fixed displacement unit and transferred via connections 61—66—63 to the variable delivery unit, but this pressure cannot aid nor oppose rotation of the motor 69 because the stroke is zero.

Nothing is added to nor subtracted from the motor's speed or torque, therefore, neglecting friction and slippage, no energy is lost.

In Fig. 12a the center of the ring 71 has been moved to the left of the center of the rotor 69 and the direction of rotation is as indicated by the arrow. Under these conditions fluid flow through the variable delivery unit can only be from the top to the bottom, as indicated by the arrows. Pressure is generated in the fixed displacement unit 51 proportional to the load on the output shaft 50 and fluid under the influence of this pressure flows via pipe connections 61—63 to the variable delivery unit, driving the rotor 69 in the direction of the arrow and transferring the power contained in the fluid to the input shaft 55. The variable delivery unit is operating as a motor. Fluid leaving the variable delivery unit via pipe connection 64 is under a minute head only, just enough to get the fluid out of the unit and into the reservoir. Thus the energy contained in the speed regulating volume of fluid coming from the differential unit has, for all practical purposes been fully recovered and fed back to the input shaft, as and in the manner above stated. Inasmuch as the speed reduction is proportional to the volume withdrawn and the volume withdrawn is proportional to the amount of movement of the stroke adjustor 71 from neutral, the speed reduction—not the actual output speed—is directly proportional to the stroke adjustor setting.

The torque—no energy being wasted—is proportional to the reciprocal of the speed, thus true torque conversion is achieved which is tantamount to constant power output.

In Fig. 13a the center of the ring 71 has been moved to the right of the center of the rotor 69 and the direction of rotation is as indicated by the arrow. Under these conditions fluid flow through the variable delivery unit can only be from the bottom to the top, per arrows, that is, fluid is taken in from the reservoir 68 and discharged through pipe connections 63—66—61 to the fixed displacement unit 51, therefore the variable delivery unit is operating as a pump, adding speed to the output shaft 50 in addition to and above the speed of the input shaft 55. The amount of speed added by the variable delivery unit is proportional to the volume added, which volume is proportional to the amount of movement of the stroke adjustor 71 from neutral, but the movement of the stroke adjustor is in a direction opposite to the movement causing a reduction in speed. The increase in speed—not the actual output speed—is directly proportional to the stroke adjustor setting.

At synchronous speed—output speed equaling input speed—all of the power to the input shaft 55 is transferred via the rotor 70 of the fixed displacement unit 51 to the output shaft 50, however, as the stroke adjustor is moved to the right from zero, a greater and greater part of the power input flows via the rotor 69. At no time is any energy wasted by throttling and all of the input power is transferred to the output shaft. As the speed increases the output torque must decrease as the reciprocal of the speed in order to maintain constant power output.

From the foregoing description it is quite evident that the size of the variable delivery unit determines the range of speeds of the output shaft by its ability to add to or subtract from the input speed.

If the displacement of the variable delivery unit per revolution of the input shaft is expressed as a percentage of the displacement of the fixed displacement unit per revolution of the input shaft, then a drive with a 100% variable delivery unit will necessarily have an output speed range from zero to 200% of the input speed.

For a drive with a 50% variable delivery unit the output speed range will be from 50% to 150% of the input speed.

A drive equipped with a 150% variable delivery unit will have an output speed range of minus 50% to plus 250%. The minus sign indicates reverse speed. The output speed of the drive, upon moving the stroke adjustor from zero, will begin to slow down and continue to do so until it reaches zero output speed. Thereafter, if movement of the stroke adjustor is continued in the same direction, the output shaft will reverse and the speed increase until it equals 50% of the input speed. For speeds from 100% to 250% of input speed the stroke adjustor is moved in a direction opposite to the direction of movement for speed reduction, by an amount proportional to the speed increase.

The total movement of the stroke adjustor, using zero speed as the starting point of measurement, is directly proportional to the speed for the entire range of operation, forward and reverse.

I claim as my invention:

1. A variable speed constant power fluid transmission comprising a balanced vane type unit having a rotor and an independently rotatable housing enclosing said rotor to form pumping chambers and provided with passageways, said housing having a diametrically diminished end provided with inlet-outlet passageways and connected with an output shaft, a stationary body co-operating with said end and having an inlet and an outlet for communication with the inlet-outlet passageways of said diminished end to form a rotary valve with said end, a variable delivery reversible pump having a fluid inlet and an outlet, said pump comprising a fixed housing enclosing a rotor to form pumping chambers and provided with passageways communicating with said fluid inlet and outlet, an input shaft coupling together the rotors of said balanced vane type unit and variable delivery pump, a driving means for said input shaft, and fluid passageways connecting the inlet and outlet of said balanced vane type unit with the inlet and outlet of said variable delivery reversible pump.

2. A variable speed constant power fluid transmission comprising a balanced vane type unit having a rotor and an independently rotatable housing enclosing said rotor to form pumping chambers and having inlet-outlet passageways and a diametrically diminished end provided with passageways and terminating in an output shaft, a stationary body cooperating with said end to form a rotary valve having an inlet and an outlet and inlet-outlet passageways for communicating with the passageways in said diminished end, a variable delivery reversible pump having a fluid inlet and an outlet and a fixed housing enclosing a rotor to form pumping chambers and provided with passageways communicating with said fluid inlet and outlet, an input shaft coupling together the rotor of said balanced vane type unit and the rotor of said variable delivery reversible pump and mounting a driving means, and fluid passageways interconnecting the inlet-outlet ports of said balanced vane type unit and said variable displacement unit for transferring the speed regulating fluid volume and the energy contained therein, between said units.

3. A variable speed constant power fluid transmission including a balanced vane type unit having a housing enclosing a rotor to form pumping chambers and rotatable independently of said rotor, said housing having a diametrically diminished end provided with passageways, and an output shaft integral therewith, a body cooperating with said diminished end to form a rotary valve having an inlet and an outlet, a variable delivery reversible unit comprising a fixed housing having passageways and an inlet and an outlet, said fixed housing encasing a rotor to form pumping chambers and including means for adjusting the stroke of said unit to vary the speed of said output shaft, an input shaft coupling together the rotor of said balanced vane type unit and the rotor of said variable delivery reversible unit and mounting a driving means for said input shaft, and fluid passageways interconnecting the inlet-outlet ports of said balanced vane type unit and said variable displacement unit.

4. A variable speed constant power fluid transmission comprising a rotatable housing having fluid-conducting passageways and terminating in a pintle having inlet and outlet ports; a rotor within said housing forming pump chambers therebetween and in communication with the fluid conducting passageways in said housing and with the ports in said pintle and constituting with said housing a fixed displacement unit; an output shaft driven by the pintle of said rotatable housing; a stationary valve body surrounding said pintle and having inlet-outlet ports registering with the inlet-outlet ports in said pintle and forming a rotary valve; a stationary housing having inlet-outlet ports; a rotor within said stationary housing forming pumping chambers therebetween, said stationary housing and rotor defining a variable displacement unit; an input shaft; a driving means mounted thereon; the rotor of said fixed displacement unit and the rotor of said variable displacement unit being connected to said input shaft to run in synchronism therewith; and fluid passageways interconnecting said inlet-outlet ports of said fixed and said variable displacement units to transfer the speed regulating fluid volume and the energy contained therein between said units.

5. A variable speed constant power fluid transmission comprising a cylindrical rotatable housing having fluid conducting passageways, a rotor within said housing forming pumping chambers therebetween and defining a fixed displacement unit, said housing connected with an output shaft; a stationary body mounted on and surrounding a reduced portion of said cylindrical rotatable housing and having ports registering with the fluid conducting passageways in said housing and thereby form a rotary valve, said stationary body provided with an inlet and an outlet; a stationary housing having inlet-outlet ports, a rotor within said stationary housing forming pumping chambers therebetween and defining a variable displacement unit; an input shaft mounting a driving means and connecting both said rotors together mechanically; and fluid conducting passageways connecting both said rotors together hydraulically thereby transferring the speed and torque regulating fluid between said units.

6. A variable speed constant power fluid transmission comprising a rotatable housing encasing a rotor to form pumping chambers therebetween, said rotatable housing having fluid conducting passageways; an output shaft connected to said rotatable housing to be driven thereby; a stationary body mounted upon and surrounding a reduced portion of said housing, said body having ports co-operating with the passageways in said rotatable housing to form a rotary valve, said body having an intake and an outlet; a stationary housing encasing a rotor to form pumping chambers therebetween, said stationary housing having inlet-outlet passageways communicating with said rotor, an input shaft upon which the rotors of said rotatable and stationary housings are mounted to rotate therewith at the speed of said input shaft, a driving means for said input shaft, and fluid passageways interconnecting the inlet-outlet ports of said valve body and said stationary housing for transferring the power contained in the fluid between said units.

7. In a variable speed constant power fluid transmission, the combination of: a main housing, an input shaft therein; a driving means for said shaft; a fixed displacement rotor connected to said shaft to rotate in synchronism therewith; a rotatable member having fluid passageways enclosing said fixed displacement rotor to form pumping chambers therebetween, said rotatable member terminating in a pintle having inlet and outlet ports communicating with the fluid conducting passageways therein; an output shaft adapted to be driven by said pintle; a stationary valve body surrounding said pintle and having inlet-outlet ports registering with the inlet-outlet ports in said pintle and co-operating with said pintle to form a rotary valve; a supplemental housing associated with said main housing and enclosing a part of said input shaft; a variable displacement rotor within said supplemental housing to form pumping chambers therebetween and having inlet-outlet ports, said variable displacement rotor connected with said input shaft to run in synchronism therewith and defining a variable displacement unit; fluid passageways interconnecting the inlet-outlet ports of said stationary valve body with the inlet-outlet ports of said supplemental housing to transfer the speed regulating fluid volume and the energy contained therein between said units.

8. A variable speed constant power fluid transmission, which comprises positive displacement hydraulic driven means having a rotatable housing and a rotor and a fluid distributor, bearing means to mount said rotor within said rotatable housing to form pumping chambers, additional bearing means coaxial with said first mentioned bearing means to support said rotatable housing for independent rotation within said distributor, inlet-outlet passage means in said distributor for conducting fluid to and from said rotatable housing and rotor; positive displacement variable delivery reversible flow hydraulic pump means having a fixed housing with inlet-outlet passage means surrounding a rotor to form pumping chambers in communication with said pump housing passage means; a rotor shaft to connect said driven means rotor to said pump means rotor for conjoint rotation; means effecting rotation of said rotor shaft; a control manifold; means interconnecting hydraulically said distributor passage means, said manifold, and said pump housing passage means; and means for connecting said rotatable housing to an output shaft.

References Cited in the file of this patent

UNITED STATES PATENTS

| | | |
|---|---|---|
| 1,571,954 | Lambert | Feb. 9, 1926 |
| 2,371,922 | Saito | Mar. 20, 1945 |
| 2,426,491 | Dillon | Aug. 26, 1947 |
| 2,750,895 | Sturm | June 19, 1956 |
| 2,758,484 | Keltner | Aug. 14, 1956 |

FOREIGN PATENTS

| | | |
|---|---|---|
| 95,338 | Sweden | Apr. 5, 1939 |